3,259,606
NOVEL COPOLYAMIDES FROM CAPROLACTAM, PIPERAZINE AND A DICARBOXYLIC ACID
Akira Okada, Yokohama, Japan, assignor to Agency of Industrial Science and Technology, Tokyo, Japan, a corporation of Japan
No Drawing. Filed Nov. 19, 1962, Ser. No. 238,754
3 Claims. (Cl. 260—78)

The present invention relates to novel copolyamides and a preparatory method therefor from epsilon-caprolactam and more particularly to novel copolyamides and a preparatory method utilizing the copolymerization of equivalent mole compositions of dibasic acid and diamine with epsilon-caprolactam.

The main object of the present invention is to provide fibers of a superior water absorption and dyeing affinity from the above copolyamides.

Another object of the present invention is to provide a useful fibrous material by the combination of materials of low price and easy spinning method.

In order to impart water absorption to fibers of polyamide at present, various studies of secondary treating method have been advanced. The problem thereof has been solved entirely by the introduction of the products of the present invention.

The present invention consists of a method of preparing copolyamides characterized by adding to epsilon-caprolactam, a dibasic acid, such as adipic acid, terephthalic acid, isophthalic acid or any mixture of the above acids, and a diamine, such a piperazine, 2,5-dimethylpiperazine, and 2-methylpiperazine, or any mixture of the above diamines, each in an equivalent mole composition, and the reacting by heating so as to form a high polymer having a high melting point and making it into fibers having superior dyeing affinity and water absorption property.

That is to say, epsilon-caprolactam and dibasic acid with diamine in equivalent moles are made into the so called nylon salt, to have a composition ratio of 95:5–80:20 by weight. Copolyamides having characteristics as above described can be obtained by reacting the diamine with epsilon-caprolactam and dibasic acid.

During the reaction, the above dibasic acid may be used in a state of free acid or in a state of derivative of ester, acid, amide and the like, but as being described clearly, it is preferred to use in the state of the salt coupled together in an equivalent mole of acid and amine as so-called nylon salt consisting of dibasic acid and diamine. Further, the advance of the reaction may be effected uniformly by the coexistence of water over from the start of the reaction to before the end of the reaction. Also, a high polymerization of the reactants may be considerably promoted by keeping a reduced pressure in a treating system at the end of the reaction.

The obtained high polymer is melted by heating and is forced out through fine holes. By affecting after treatments of stretching and heat treatment and the like of the product, fibers having useful properties in practice can be produced. These fibers have not a sufficient durability in hot water when treated only by stretching, but by imparting heat treatment at constant length in heated air or in water vapor, fibers are obtained having sufficient durability in hot water.

Since these fibers are made from copolymers, they are rich in region of non-crystallization, and dyeing and inversion of water are liable to be subjected, but in the main chain thereof they have amide acid bond in said bond, there is a secondary amide bond formed from piperazine.

Said bond, having no movable proton capable of forming hydrogen bonds, does not produce a hydrogen bridge between molecules forming a high copolymer and consequently such amide bond acts efficiently as an absorption seat for dye and water so as to give it good water absorption dyeing affinity. When the addition ratio of nylon salt is made smaller than that of the above range, the properties of the resultant copolymer end fibers are substantially the same as those of nylon 6. Further, when larger than the range of above, the melting point of the high polymer is considerably decreased, and the durability in hot water of the fiber is also considerably decreased so as not to be used in practice.

A practicing example: 0.8 g. of nylon salt of adipic acid and piperazine, and 7.5 g. of epsilon-caprolactam are poured into a test tube and the mixture is heated over two hours at the temperature of 230° C. while a stream of nitrogen is passed through the tube.

Next, when the solution is kept over 20 minutes under reduced pressure of 0.5 mm. Hg at the same as above temperature, a high polymer having a colorless semitransparent melt spinning property and having a melting point of 183° C. is obtained.

The melted substance is forced out through fine holes and is stretched out about 3.5 times of its original length at normal temperature and the resulting fibers are heat treated at the temperature of 183° C. at constant length. The resultant fibers have the following properties:

Water absorption _____ About 7%.
Strength _____ About 3–4 g./denier
Extensibility _____ About 25–35%.
Young's modulus _____ About 150–400 kg./mm.$^2$.

Water absorption of the fiber in the present invention has a better value than that of a conventional nylon fiber.

Also, in comparing it with nylon 6, the dyeing affinity is superior as shown in the following table.

|  | Direct dyestuff | Disperse dyestuff | Acidic dyestuff |
| --- | --- | --- | --- |
| Bath Composition. | Congo Red (0.2 g./l.) | Diacellition Fast Brilliant Blue BF 0.5 g./l. monogen 2g./l. | Polor Brilliant Red B Sapia 85/100 Conc. 0.2 g./l. acetic acid 0.5 cc./l. |
| Bath Ratio | 100 | 100 | 100 |
| Temperature, ° C | 80 | 80 | 80 |
| Hour | 1 | 1 | 1 |

ABSORPTION FACTOR FOR DYESTUFF, PERCENT

| | | | |
| --- | --- | --- | --- |
| Nylon 6 | 61.0 | 45.0 | 94.6 |
| In the case of the present invention | 96.0 | 55.0 | 100.0 |

I claim:
1. A polycarbonamide consisting essentially of (1) epsilon-caprolactam, (2) at least one diamine selected from the group consisting of piperazine, 2,5-dimethyl- piperazine, and 2-methylpiperazine, and (3) at least one dicarboxylic acid selected from the group consisting of adipic acid, terephthalic acid, and isophthalic acid, the mole ratio of diamine to dicarboxylic acid being 1:1, and the weight ratio of caprolactam to diamine-dicarboxylic acid being between 95:5 and 80:20, said polycarbonamide being suitable for the manufacture of fibers having superior dyeing affinity and water absorption properties 2. The polycarbonamide of claim 1, wherein said diamine is piperazine, and wherein said dicarboxylic acid is terephthalic acid.

3. A novel fiber formed of a polycarbonamide having the composition of claim 1.

References Cited by the Examiner

UNITED STATES PATENTS

| 2,130,948 | 9/1938 | Carothers | 260—78 |
| 2,244,192 | 6/1941 | Flory | 260—78 |
| 2,252,555 | 8/1941 | Carothers | 260—78 |
| 3,143,527 | 8/1964 | Wittebecker | 260—78 |

FOREIGN PATENTS 789,491    1/1958   Great Britain.

WILLIAM H. SHORT, *Primary Examiner.*

H. D. ANDERSON, *Assistant Examiner.*